United States Patent
Blasi (10) Patent No.: US 11,813,715 B2
(45) Date of Patent: Nov. 14, 2023

(54) APPARATUS FOR SUCCESSIVELY CUTTING AND DRIVING A SHAFT

(71) Applicants: Robert A. Blasi, Pratt, KS (US); Teresa K. Blasi, Pratt, KS (US)

(72) Inventor: Robert A. Blasi, Pratt, KS (US)

( * ) Notice: Subject to any disclaimer, the term of this patent is extended or adjusted under 35 U.S.C. 154(b) by 639 days.

(21) Appl. No.: 17/025,485

(22) Filed: Sep. 18, 2020

(65) Prior Publication Data

US 2021/0001445 A1 Jan. 7, 2021

(51) Int. Cl.
*B27B 5/32* (2006.01)
*B24B 45/00* (2006.01)

(52) U.S. Cl.
CPC .............. *B24B 45/006* (2013.01); *B27B 5/32* (2013.01)

(58) Field of Classification Search
CPC ................................ B24B 45/006; B27B 5/32
See application file for complete search history.

(56) References Cited

U.S. PATENT DOCUMENTS

| | | |
|---|---|---|
| 201,262 A | 3/1878 | McDowell |
| 1,077,196 A | 10/1913 | Hall, Jr. |
| 1,206,311 A | 11/1916 | Dillinger |
| 1,581,057 A | 4/1926 | Hill |
| 1,589,862 A | 6/1926 | Quint |
| 1,629,003 A | 5/1927 | Schonfeld |
| 2,052,534 A | 8/1936 | Quarles |
| 2,787,265 A | 4/1957 | Neidt |
| 2,809,697 A | 10/1957 | Menzies |
| 3,136,057 A | 6/1964 | Jones et al. |
| 3,393,442 A | 7/1968 | Brewer |
| 3,691,612 A | 9/1972 | Layne |
| 4,057,899 A | 11/1977 | Ostendorf |
| 4,077,103 A * | 3/1978 | Kelley ................. B25B 27/023 29/259 |
| D255,768 S | 7/1980 | Immel et al. |
| 4,457,033 A | 7/1984 | Lightner |
| 4,958,434 A | 9/1990 | Marschner |
| 5,067,219 A | 11/1991 | Ulmer |
| 5,159,743 A | 11/1992 | Somerville |
| 5,163,211 A * | 11/1992 | Rubino ................. B25B 27/023 29/259 |

(Continued)

FOREIGN PATENT DOCUMENTS

| | | |
|---|---|---|
| CN | 1053 56687 | 10/2017 |
| CN | 2065 44142 | 10/2017 |

(Continued)

*Primary Examiner* — Nirvana Deonauth
(74) *Attorney, Agent, or Firm* — Kenneth H. Jack; Davis & Jack, L.L.C.

(57) ABSTRACT

An apparatus for cutting and driving a shaft which extends from a hub, the apparatus incorporating a hub adapter fitted to receive the hub; a plurality of set screws mounted upon the hub adapter for clamping the adapter upon the hub; a half of a releasable fastener attached to the hub; a pair of adapters which are fitted for alternatively receiving the hub adapter; a pair of second halves of the releasable fastener which are adapted for alternatively completing the releasable fastener, wherein each of the second halves of the releasable fastener is connected to one of the adapters among the pair of adapters; a pivoting rotary saw connected to one of the adapters among the pair of adapters; and a shaft driver tool connected to the other of the adapters among the pair of adapters.

9 Claims, 8 Drawing Sheets

(56) References Cited

U.S. PATENT DOCUMENTS

| | | |
|---|---|---|
| 5,479,688 A | 1/1996 | Rubino et al. |
| 6,223,410 B1 | 5/2001 | Sroka |
| 6,418,600 B1 | 7/2002 | Benoit |
| 6,609,283 B1 | 8/2003 | Somerville |
| 6,637,089 B1 | 10/2003 | English |
| 6,654,997 B2 | 12/2003 | Donovan et al. |
| 6,671,962 B2 | 1/2004 | Watamura |
| 6,684,472 B2 | 2/2004 | Abdelmoula et al. |
| 6,823,574 B2 | 11/2004 | Swanson |
| 7,125,206 B2 | 10/2006 | Turner |
| 7,152,325 B2 | 12/2006 | Green et al. |
| 7,496,999 B2 | 3/2009 | Robarge |
| 7,658,368 B2 | 2/2010 | Laun |
| 8,261,454 B2 | 9/2012 | Wilson, Jr. |
| 8,490,522 B1 | 7/2013 | Bryan |
| 9,085,071 B2 | 7/2015 | Larouche |
| 9,325,227 B2 | 4/2016 | Survant |
| 9,566,652 B2 | 2/2017 | Nasiell |
| 9,782,821 B1 | 10/2017 | Gregory |
| 9,808,922 B2 | 11/2017 | Breschi et al. |
| 9,962,820 B2 | 5/2018 | Durbin et al. |
| 10,611,007 B2 | 4/2020 | Seamons |
| 2002/0010996 A1 | 1/2002 | Sarver |
| 2006/0075617 A1 | 4/2006 | Toosky et al. |
| 2009/0022559 A1 | 1/2009 | Hughes, Jr. |
| 2010/0224034 A1 | 9/2010 | Fitzpatrick |
| 2014/0237787 A1 | 8/2014 | Saito |
| 2014/0345104 A1 | 11/2014 | Andrews et al. |
| 2015/0174747 A1* | 6/2015 | Durbin ................ B25B 27/06 29/255 |

FOREIGN PATENT DOCUMENTS

| | | |
|---|---|---|
| CN | 105356687 | 10/2017 |
| CN | 206544142 | 10/2017 |
| DE | 202006006932 | 7/2006 |
| DE | 20 2006006932 | 8/2006 |
| JP | 6066654 | 4/1985 |

* cited by examiner

APPARATUS FOR SUCCESSIVELY CUTTING AND DRIVING A SHAFT

FIELD OF THE INVENTION

This invention relates to shaft cutting and shaft driver tools. More particularly, this invention relates to such tools which are adapted for operation within tight or close working spaces such as the interior of a sirocco fan of an HVAC system's air blower.

BACKGROUND OF THE INVENTION

Hub mounted drive shafts or axles are commonly presented within the hollow interior space of a sirocco or "squirrel cage" fan. Such axle hubs commonly receive a central and axially extending axle or drive shaft, such hubs commonly include a set screw for securely mounting the hub upon the drive shaft.

In many cases, the sirocco fan must be disassembled and separated from the axle. A need for such disassembly is often occasioned by a need to change or repair the electric motor whose rotary power output comprises the subject drive shaft. However, in many cases, the hub has become seized upon the drive shaft through the action of rust and corrosion, such seizure preventing the drive shaft from being withdrawn from the hub by lessening the hub's set screw. Also in many cases, such seized drive shaft protrudes excessively from the hub.

Within the tight and close space of the interior of such sirocco fan, it is often difficult to work with and utilize known tools in order to separate such seized fan hub from the drive shaft. Where the drive shaft protrudes beyond the hub, commonly available shaft driving tools are incapable of simultaneously grasping the hub and driving against the extended end of the axle. Shortening the axle through the use of commonly available cutting tools is often difficult to accomplish within the constrained available working space at the interior of the sirocco fan.

The instant inventive apparatus for successively cutting and driving a shaft solves or ameliorates the problems and challenges discussed above by providing a reconfigurable tool which is easily operated within the interior of a sirocco fan. The inventive tool may be driven by a power drill or socket driver for initially cutting and shortening such fan's excessively protruding drive shaft. Upon reconfiguration, the same drill or driver may actuate a shaft driving function of the tool for driving the shortened shaft out of the sirocco fan's axle shaft hub.

BRIEF SUMMARY OF THE INVENTION

The instant inventive apparatus is preferably adapted for and is utilized for cutting a shaft (typically an axle shaft or drive shaft), and successively or subsequently mechanically driving such shaft out of an axle hub which receives and mounts such shaft. In a typical circumstance and usage environment of the instant apparatus, the hub is welded to a central rotary drive plate within the interior of a sirocco or squirrel cage fan. Such hub preferably is positioned centrally and axially with respect to the rotary fan, such hub commonly receiving and mounting the rotary drive shaft which turns the fan. During the initial assembly, such hubs are commonly fixedly and removably attached to such drive shafts by means of a set screw which is threadedly mounted upon the hub for radially inward extension into the hub's hollow bore.

After long usage of such sirocco fan, corrosion and rust often fixes or seizes the hub onto the axle shaft, preventing and interfering with any easy mechanical disassembly of the hub's mount upon the axle shaft. In such circumstances, utilization of a commonly known shaft driving tool is often mechanically blocked or interfered with by an excess extension of the drive shaft beyond the hub.

The instant inventive apparatus overcomes the sirocco fan hub disassembly obstacles described above by providing a first adapter component which is preferably configured as a cylindrical cap having an interior which is fitted for upwardly receiving an axle hub mount of the type described above. In a preferred embodiment, the ceiling of such cap configured adapter is apertured so that the above described excess extension of a hub mounted axle may extend upwardly therethrough upon mounting of the cap adapter.

In the preferred embodiment of the instant inventive apparatus, a plurality of set screws are helically threadedly mounted within and through the circular peripheral wall of the first adapter, such screws being positioned and aligned for, upon upward receipt of the axle hub within the hollow interior of the first adapter, clamping against and securely holding the axle hub.

A further structural component of the inventive apparatus comprises a first half of a releasable fastener, such first half being fixedly attached to or formed wholly with the preferably cap configured first adapter. In a preferred embodiment, first fastener half component comprises a plurality of "L" slots which extend into the first adapter from its outer periphery and which open both upwardly and radially outwardly. In a suitable alternative configuration of the instant inventive apparatus, the releasable fastener's first half component may comprise male screw threads which extend helically about the outer periphery of the first adapter component.

Further structural components of the instant inventive apparatus comprise two of or a pair of second adapters, each such second adapter preferably being configured as a downwardly opening and cylindrical cap having a peripheral wall whose inside diameter is fitted for receiving the outside diameter of the first adapter. In the preferred embodiment, one of the second adapters (or a first adapter among the pair of second adapters) is associated with and supports a shaft cutting saw, while the other or second adapter among said pair of adapters is associated with and mechanically supports a shaft driving tool.

Further structural components of the instant inventive apparatus comprise second halves of the releasable fastener, such second halves constituting a pair of second halves. Each fastener half among such pair of second releasable fastener halves is configured, fitted, and adapted for engaging the first half of the releasable fastener. Where the first half of the releasable fastener comprises the plurality of "L" slots, as is preferred, each of the second halves of the releasable fastener preferably comprises a matching plurality of pins which are fixedly attached to or formed wholly with the peripheral wall of one of the second adapters, such pins extending radially inwardly from such peripheral walls. Alternatively, where the first half of the releasable fastener comprises male helical screw threads, each of the second halves of the releasable fastener may comprise threadedly mating female helical screw threads which are presented at the inner walls of the second adapters.

Accordingly, the second adapter components of the instant inventive apparatus may be securely, releasably, and alternatively attached to the first releasable fastener half for alternatively mounting the pair of second adapters onto the first adapter.

A further structural component of the instant inventive apparatus comprises a saw which is connected operatively to the one second adapters. In a preferred embodiment, such saw is positioned and adapted for, upon mounting such one second adapter upon the first adapter, cutting the above described excessively protruding drive shaft in order to shorten such shaft. Cutting and shortening the shaft beneficially allows a subsequent performance by the apparatus of a shaft driving operation.

In a preferred embodiment, the saw component comprises a rotary saw blade mounted upon the distal end of a pivoting arm, wherein the proximal end of such arm is pivotally mounted upon an upper surface of the one of the second adapters. Also in the preferred embodiment, an upwardly extending rotary drive shaft is connected operatively to the rotary saw blade, such drive shaft being engageable with a chuck of a power drill or socket driver for powered turning the saw blade. Operation of such drill or driver for turning the saw blade while simultaneously pivoting the arm and blade toward the protruding drive shaft effectively cuts and shortens the drive shaft.

A further and final component of the instant inventive apparatus comprises a driver tool which is fixedly attached to and supported by the other second adapter. In a preferred embodiment, the driver tool comprises a jack actuator which presents male helical threads upon a screw shaft and presents mating female helical threads supported upon such other second adapter. Upon subsequent and successive mounting of such other second adapter upon the first adapter, such jack screw assembly may be operated to drive its preferably central and axially screw shaft against the previously cut and shortened end of the axle shaft in order to drive the axle shaft out of the hub.

Following completion of the above described successive modes of use of the instant inventive apparatus, the seized hub described above may be removed from and extracted from the sirocco fan's drive shaft.

Accordingly, objects of the instant invention include the provision of an apparatus for successively cutting and driving a shaft which incorporates structures, as described above, and which arranges those structures in relation to each other in manners described above, for the performance of and achievement of beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 2:
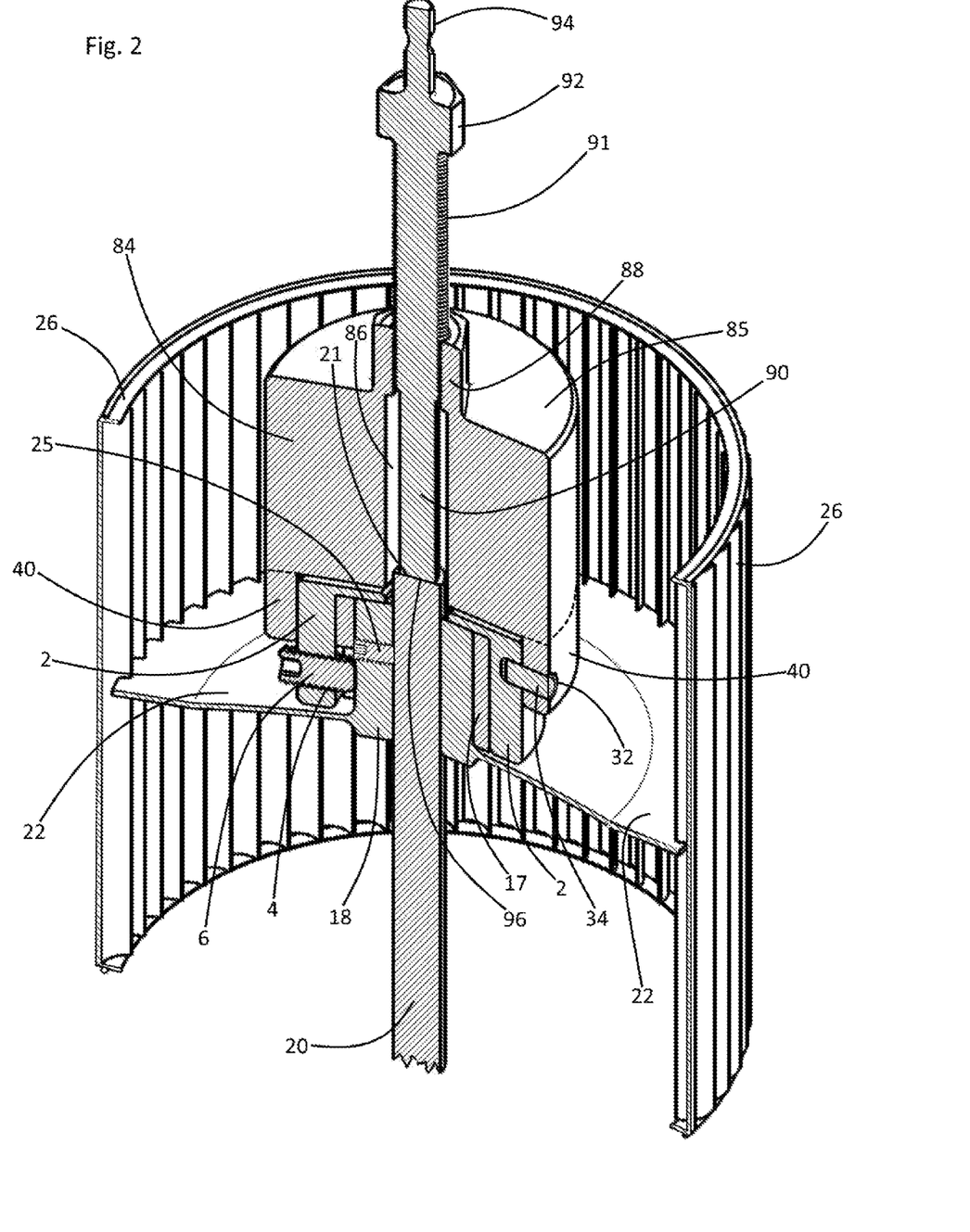
FIG. 2 presents a sectional view of the first adapter of FIG. 1, the view further showing other components of the assembly in sectional view.

Referring now to the drawings, and in particular to Drawing FIG. 2, a sirocco fan or squirrel cage fan 26 (also known as a centrifugal blower) is shown in sectional view. Such fan 26 is of the type which is commonly utilized within a housing of an HVAC system air blower. The sirocco fan 26 has a inner wall 22 which centrally and axially supports a hollow bored axle mounting hub 18. Fans such as the sirocco fan 26 are commonly rotatably driven by an electric motor (not depicted within views) having a rotary power output shaft 20. Such rotary power output shaft 20 is commonly received within an axle mounting hub 18, and such hub 18 is commonly fixedly secured to the axle shaft 20 by means of a set screw 25.

In order to maintain an HVAC system having a blower which incorporates such sirocco fan 26, the motor which drives the axle shaft 20 may need to be removed and replaced. A common means for effecting such removal entails loosening of set screw 25 in order to allow the motor and its axle shaft 20 to be withdrawn from hub 18. However, in many cases, the juncture of the axle shaft 20 and the hub 18 has become rusted or corroded, undesirably seizing the hub 18 onto the axle shaft 20 and preventing its removal.

Figure 1:
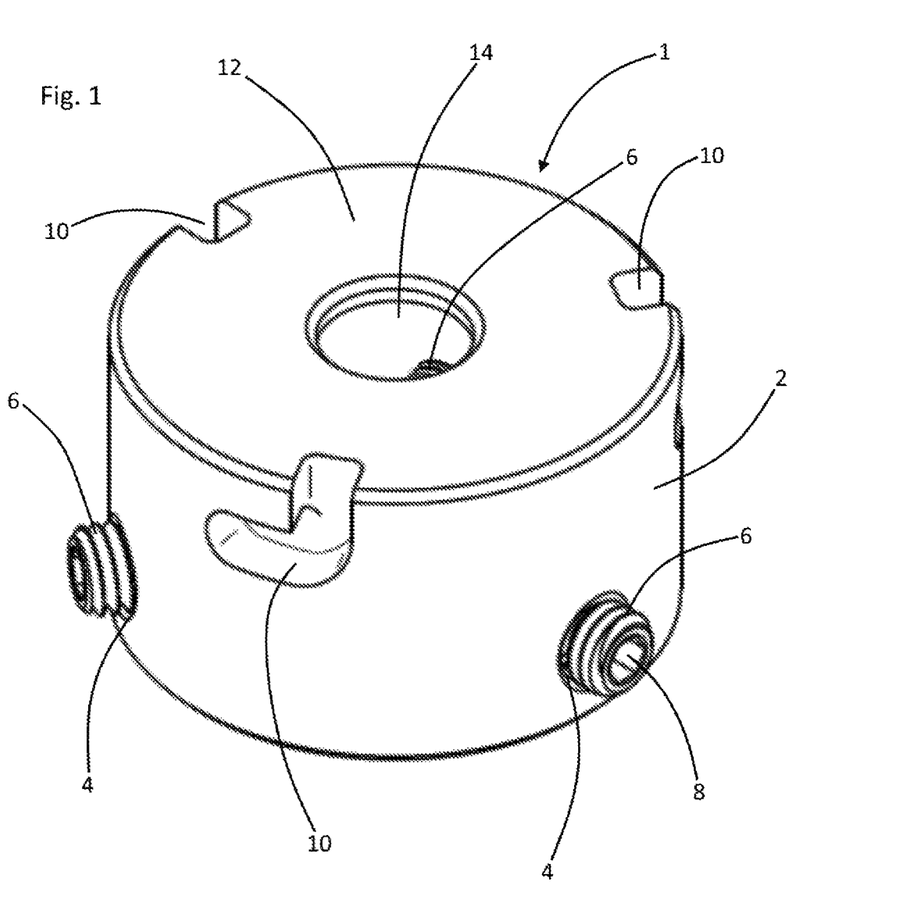
FIG. 1 is a perspective view of a first adapter component of the instant inventive apparatus for successively cutting and driving a shaft.

To overcome such undesirable seizure of hub 18 onto axle shaft 20, the instant inventive apparatus provides a first adapter which, referring further to FIG. 1, is referred to generally by Reference Arrow 1. The first adapter 1 is preferably configured as a cylindrical cap having an annular peripheral wall 2, having a ceiling 12, and having a shaft extension aperture 14 which opens the interior of the adapter 1 at the ceiling 12.

A plurality of set screws 6 is mounted operatively upon the peripheral wall 2 of the first adapter 1, such set screws suitably having Allen wrench engaging sockets 8. As an alternative to such Allen sockets 8, the radially outer ends of the set screws 6 may be configured to present square heads or hexagonal heads in order to allow additional turning torque to be applied to such screws. The screws 6 are received within helically threaded apertures 4 within the adapter's circular peripheral wall 2. In the preferred embodiment, the plurality of set screws comprises three set screws which are arranged at 120° circumferential increments about the wall 2.

Upon the adapter 1's receipt of hub 18 within its downwardly opening interior space, set screws 6 may be tightened against the hub 18 in order to securely affix the adapter 1 thereto. In order to assist in properly axially and concentrically aligning the adapter 1 upon the hub 18 prior to tightening the set screws 6, a centering cylindrical spacer 17 may be interposed between the hub 18 and the adapter wall 2.

Figure 3:
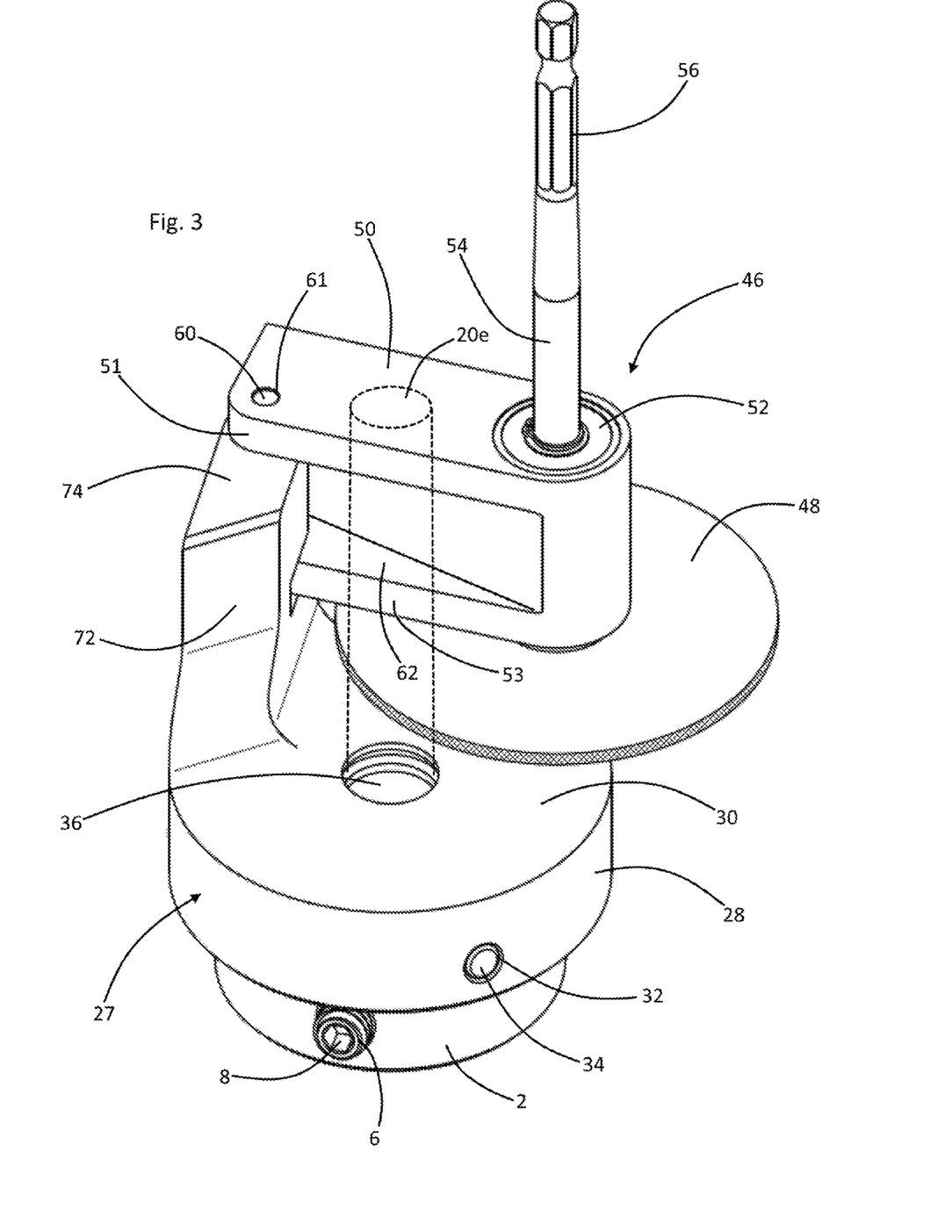
FIG. 3 presents a perspective view of assembled first adapter, second adapter, and saw components of the inventive apparatus.
Figure 6:
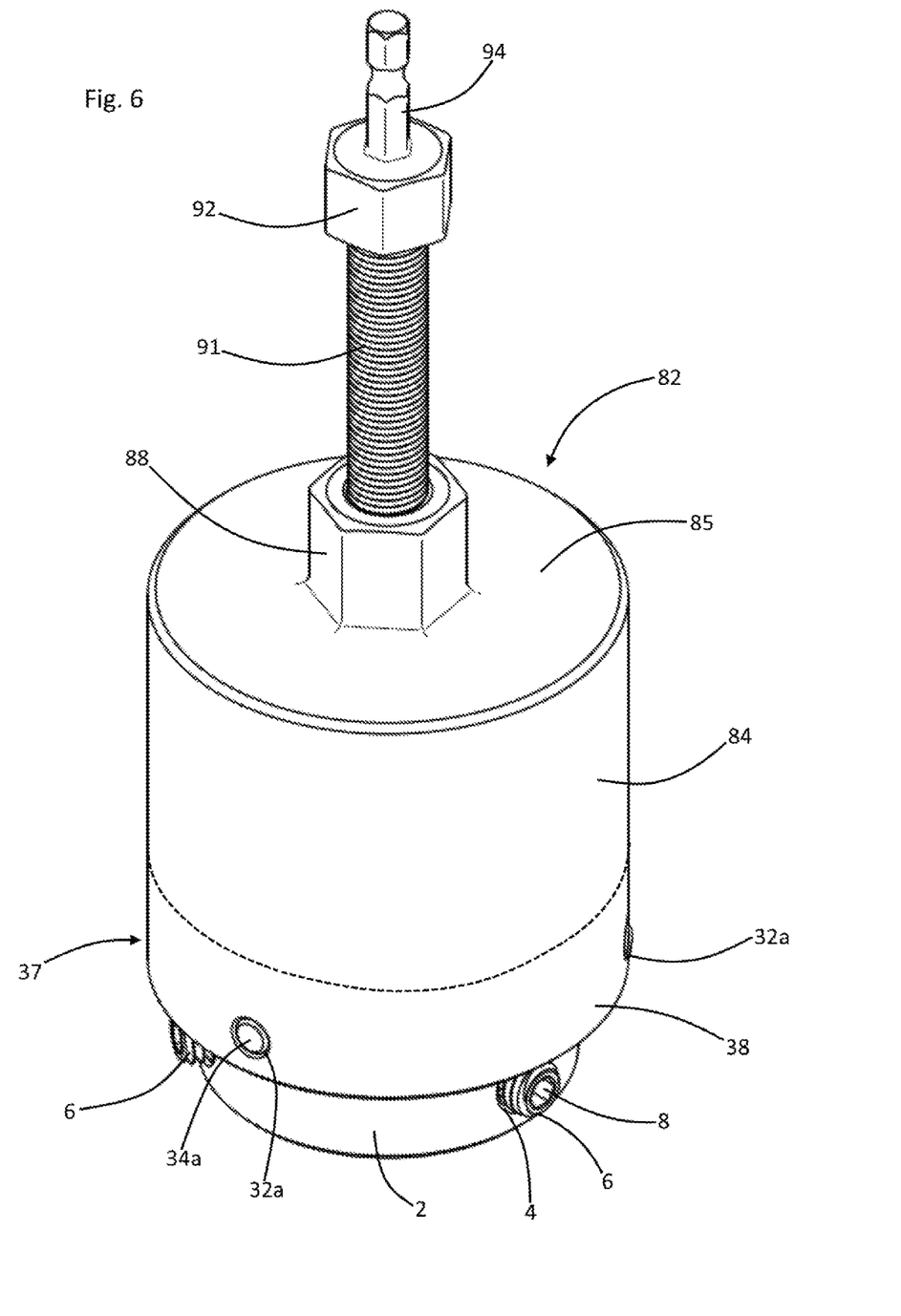
FIG. 6 presents a perspective view of assembled first adapter, other second adapter, and jack screw actuator components of the inventive assembly.
Figure 7:
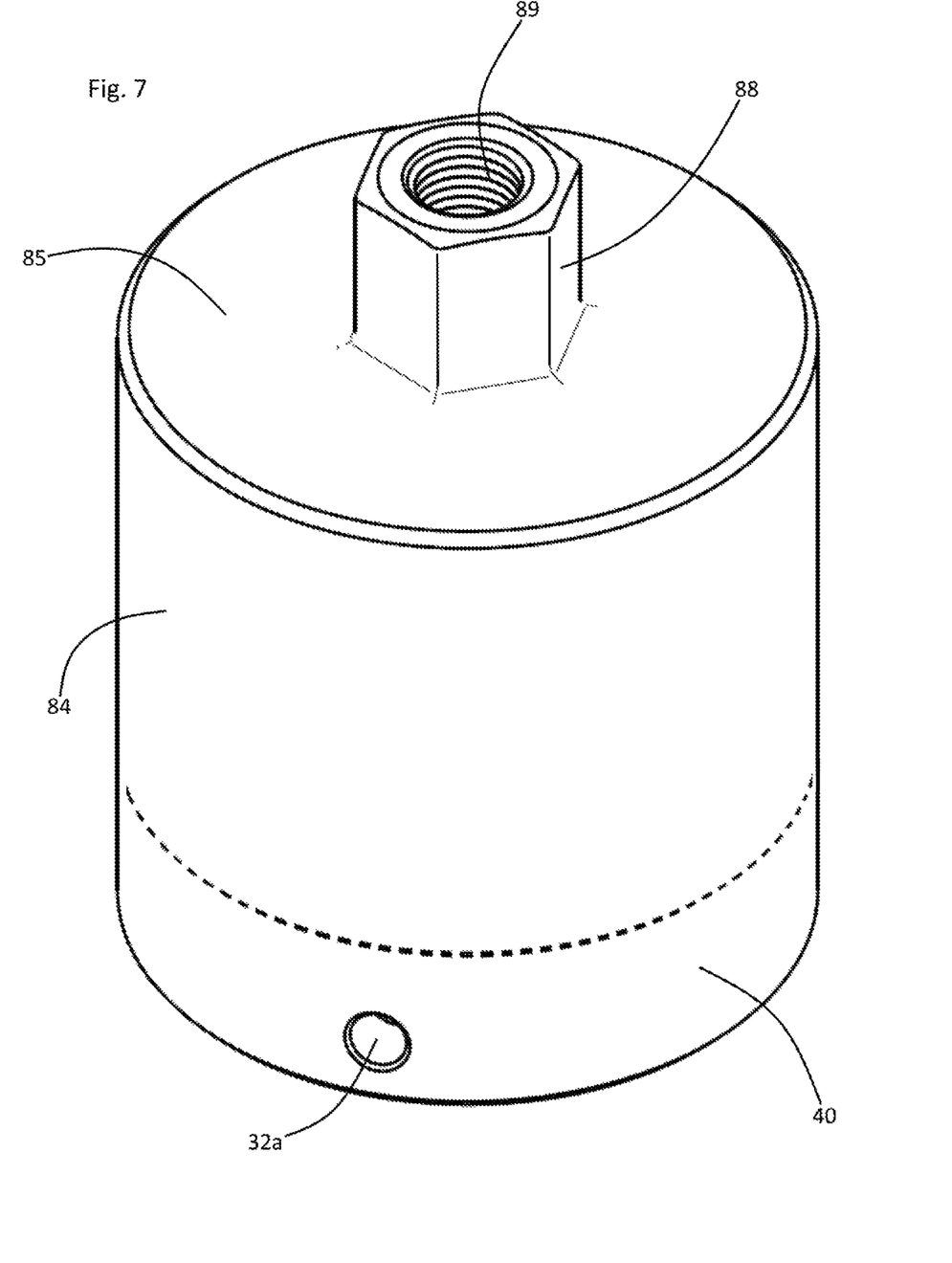
FIG. 7 shows a disassembled other second adapter component of the structure of FIG. 6.
Figure 8:
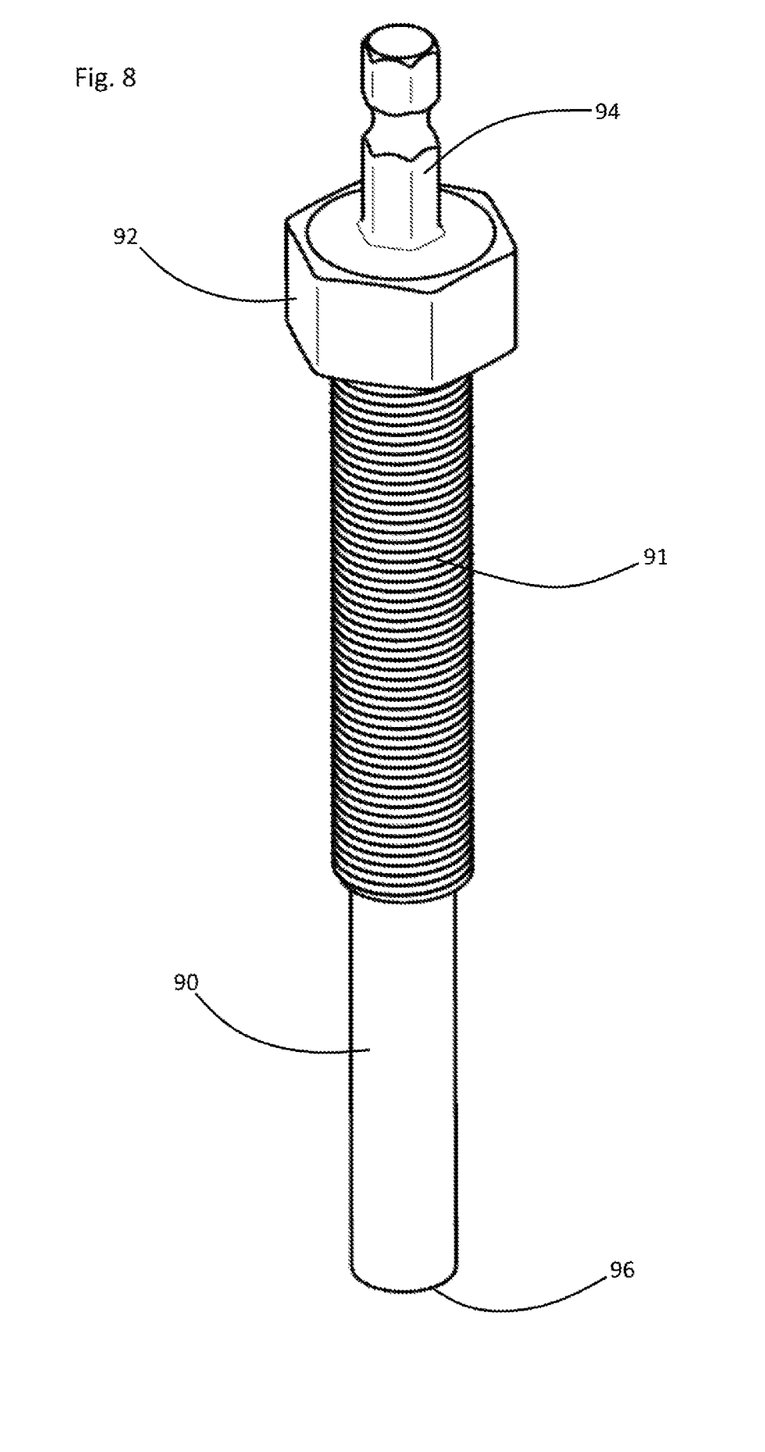
FIG. 8 shows a disassembled jack screw component of the structure of FIG. 6.

Referring simultaneously to FIGS. 1, 3, and 6, a pair of second adapters are referred to generally by Reference Arrows 27 and 38. Each adapter among such pair of second adapters 27 and 38 is preferably fitted for nestingly receiving the first adapter 1 within its interior space. Similarly with the first adapter's presentation of its circular peripheral wall 2, each of the second adapters 27 and 38 presents a circular peripheral wall, adapter 27 having circular peripheral wall 28, and adapter 38 presenting a substantially identical circular peripheral wall 40. One of the second adapters, second adapter 27 for example, preferably includes a ceiling 30 having an aperture 36 for receipt of, referring further to FIG. 2, an excess extension 20e of drive shaft 20, such excess extension 20e being designated in dashed lines.

A releasable fastener component of the inventive assembly is necessarily provided for alternatively interconnecting the first adapter 1 with the individual members of the pair of second adapters 27 and 38. In a preferred embodiment, a provided first half of the releasable fastener is fixedly attached to, or is formed wholly with the first adapter 1. As shown in FIG. 1, such first half of the releasable fastener may comprise a plurality of "L" slots 10 which extend into the peripheral wall 2 of the first adapter 1, such slots opening radially outwardly and further opening upwardly at the periphery of the adapter's ceiling 12.

Corresponding with the instant inventive apparatus's provision of the pair of second adapters, the invention provides a pair of second halves of its releasable fastener component. Such pair of second halves preferably comprises a plurality of pins 34 and another plurality of pins 34a. The first plurality of pins 34 is preferably securely mounted via pressure fitting within pin receiving apertures 32 which extend through the peripheral wall 28 of the exemplary one of the second adapters 27. Pins 34a may be similarly mounted within pin receiving apertures 32a formed within the peripheral wall 40 of the other second adapter 38. The pins 34 and 34a are preferably circumferentially arrayed about walls 28 and 38 so that they may alternatively engage the "L" slots 10 of first adapter 1. The completed releasable fastener component of the instant inventive apparatus comprises either engagements of pins 34 with "L" slots 10 or engagements of pins 34a with those same slots, such fastener comprising a circumferential array of pin and "L" slot joints.

As a suitable alternative to the pin and "L" slot joint configuration of the apparatus's releasable fastener component, such component may be configured as a helically threaded joint wherein male helical threads are presented upon the first adapter 1 and a pair of female helical threads are presented at the inner surfaces of the peripheral walls 28 and 40 of the second adapters 27 and 38 (such helical adapter configured releasable fastener not being shown within views).

Figure 4:
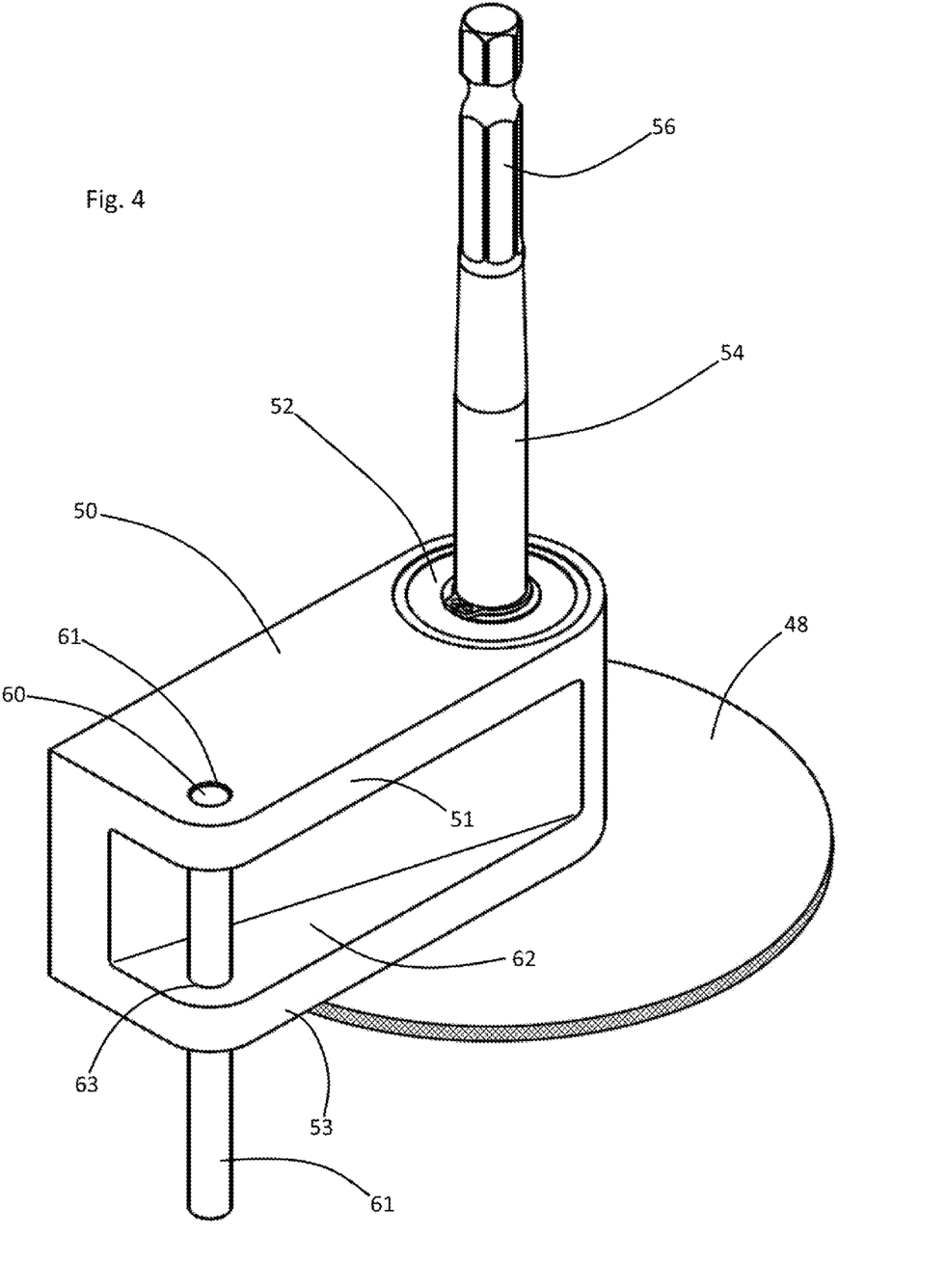
FIG. 4 depicts disassembled saw components of the structure of FIG. 3.
Figure 5:
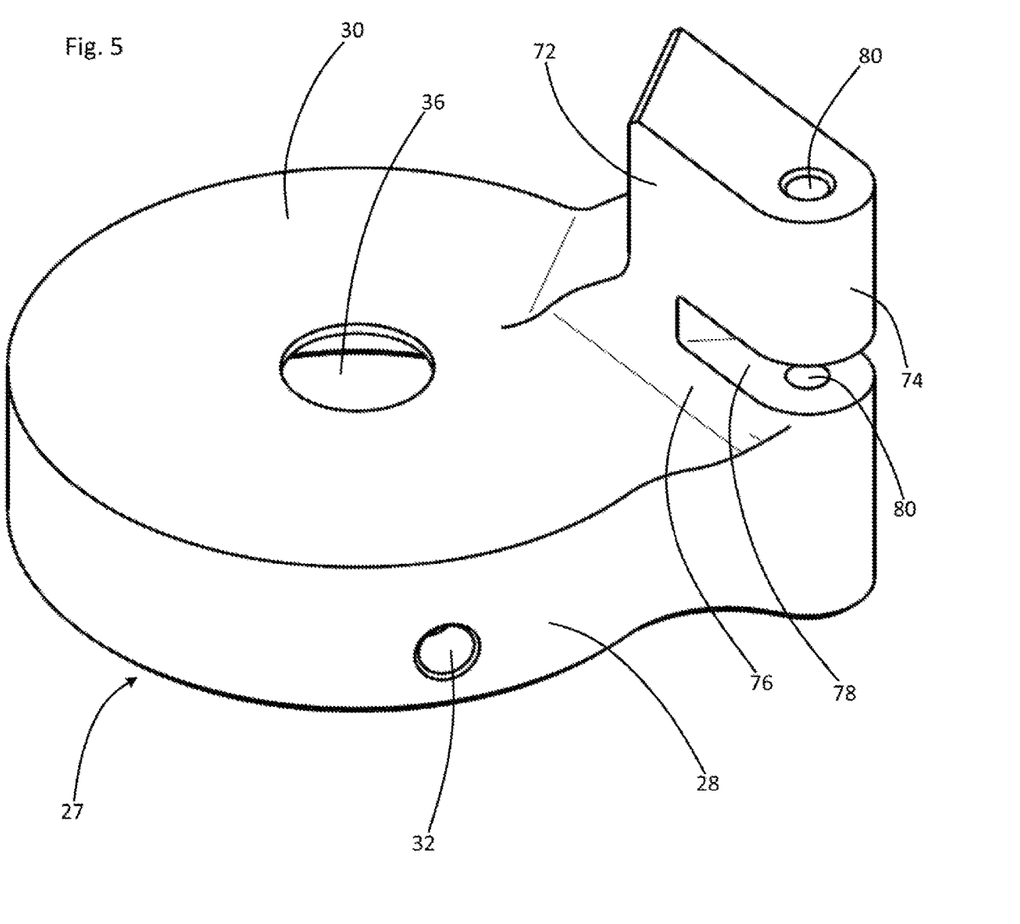
FIG. 5 presents one of the second adapter components of the structure of FIG. 3, such one second adapter being disassembled.

Referring to FIGS. 3, 4, and 5, a saw component 46 of the apparatus comprises a rotary cutting element 48 which constitutes either a toothed metal cutting saw blade or a metal grinding wheel, either of which is considered to be a rotary saw blade. The rotary saw blade 48 is preferably mounted rotatably upon the distal end of a pivot arm 50 by means of a rotary bearing mount 52. The proximal end of pivot arm 50 is pivotally supported by a pivot mount pedestal 72 which includes a riser section 76 to mechanically assure that, upon clockwise pivoting of pivot arm, the blade 48 may pass immediately above the ceiling 30 of the second adapter 28. A lower slot 78 formed within the pedestal mount 72 allows the mount's upper portion 74 to function as a pin component of a pin, eye, and clevis joint or hinge. Such pin component 74 may extend into a clevis space 62 which is upwardly and downwardly defined by clevis ears 51 and 53 which are formed integrally with pivot arm 50. The joint's pin component 60 extends vertically through eyes 61 and 80 of such clevis joint.

Referring to FIGS. 1-5, a rotary drive shaft 54 extends through bearing 52 to connect and rotate the saw blade 48. Such drive shaft 54 allows an attached electric drill (not shown in views) to rapidly turn the saw blade 48. The upper end 56 of such drive shaft 54 is preferably hexagonally configured for secure engagement with the bit engagement chuck of such electric drill or of an electric socket driver. Upon powered operation of the saw blade 48, the pivot arm 50 including the attached electric drill may be manually rotated as a unit clockwise causing the saw blade 48 to cut the excess extension 20e of the axle shaft 20. Following such shaft cutting operation, the second adapter 27, along with all of its upwardly attached components, may be released from the first adapter 1.

Referring simultaneously to FIGS. 2, 6, 7, and 8, a shaft driving tool is referred to generally by Reference Arrow 82. Such tool 82 is preferably fixedly attached to or formed wholly with the apparatus's other second adapter 37. The driver tool 82 preferably includes a cylindrical body 84 having an upper end 85, and having a vertically extending hollow bore 86. An upwardly extending collar 88 includes an internally helically threaded hollow bore which communicates with the underlying hollow bore 86. A screw shaft 90 having helical threads 91 extends through and helically threadedly engages with the threads of collar 88.

Hub mounting of such other second adapter 37 among the invention's pair of second adapters is depicted in FIG. 2. Upon such mounting, a wrench may be applied to hexagonal lands 92 for clockwise turning of the screw shaft 90. Such clockwise turning causes the shaft's lower end 96 to bear against the previously shortened upper end 21 of the axle shaft 20. Engagements of pints 34a of second adapter 37 with the "L" slots 10 of the first adapter 1 oppose such shaft bearing force. Continued wrench actuated turning of screw 90 progressively drives the axle shaft 20 out of hub 18. A drill or socket driver adapter 94 is preferably wholly formed with the upper end of the screw shaft 90 so that the same drill or socket driver which operates the saw assembly 46 may operate the driver tool 82.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An apparatus for successively cutting and driving a shaft, said shaft extending from a hub, said apparatus comprising:
    (a) a first adapter fitted for receiving the hub, said first adapter having an upper opening;
    (b) a plurality of set screws mounted operatively upon the first adapter, said set screws being positioned for, upon the first adapter's receipt of the hub, attaching the first adapter to hub;
    (c) a first half of a releasable fastener, said fastener half being fixedly attached to or formed wholly with the first adapter;
    (d) a pair of second adapters, each adapter among said pair of adapters being fitted for receiving the first adapter;
    (e) a pair of second halves of said releasable fastener, wherein each fastener half among said pair of second fastener halves is adapted for engaging said fastener's first half, wherein one of the releasable fastener halves among said pair of second halves of said releasable fastener is fixedly attached to or formed wholly with one of the adapters among the pair of second adapters, and wherein the other releasable fastener half among said pair of second halves of said releasable fastener is fixedly attached to or formed wholly with the other second adapter;

(f) a saw connected operatively to the one of the second adapters, said saw being adapted for, upon the first adapter's receipt of the hub and upon the one of the second adapter's receipt of the first adapter, shortening the shaft; and (g) a driver tool connected operatively to the other second adapter, the driver tool being adapted for, upon the first adapter's receipt of the hub and upon the other second adapter's receipt of the first adapter, driving against the shaft.

2. The apparatus of claim 1 wherein the first half of the releasable fastener comprises a plurality of "L" slots.

3. The apparatus of claim 2 wherein each of the releasable fastener's second halves comprises a plurality of pins fitted and positioned for engagement with the plurality of "L" slots.

4. The apparatus of claim 3 wherein the first half of the releasable fastener and the pair of second halves of the releasable fastener comprises a plurality of pin and "L" slot joints formed by the plurality of pins and by the plurality of "L" slots.

5. The apparatus of claim 4 wherein the saw comprises an arm having proximal and distal ends, wherein the saw further comprises a rotary blade, wherein the arm's proximal end is pivotally attached to the one of the second adapters, and wherein the rotary blade is mounted upon the arm's distal end.

6. The apparatus of claim 5 wherein the driver tool comprises a jack screw assembly.

7. The apparatus of claim 6 further comprising a drive shaft connected operatively to the rotary blade.

8. The apparatus of claim 7 wherein the jack screw assembly comprises a screw having a wrench or chuck engaging end and a shaft driving end.

9. The apparatus of claim 8 wherein the drive shaft has a chuck engaging end.

* * * * *